Dec. 11, 1951  A. C. EKVALL  2,578,343
DEFLECTION COIL TESTING APPARATUS AND METHOD
Filed June 13, 1946

INVENTOR
A. C. EKVALL
BY
H. O. Wright
ATTORNEY

UNITED STATES PATENT OFFICE 2,578,343

DEFLECTION COIL TESTING APPARATUS AND METHOD

Adolph C. Ekvall, Brooklyn, N. Y., assignor to Bell Telephone Laboratories, Incorporated, New York, N. Y., a corporation of New York Application June 13, 1946, Serial No. 676,396

4 Claims. (Cl. 315—27)

This invention relates to apparatus for and a convenient method of testing air-core deflection coils for cathode ray oscilloscopes. More particularly it relates to a method and an arrangement of apparatus for determining, quickly and conveniently, the degree of linearity of the magnetic fields of air-core deflection coils for cathode ray oscilloscopes.

For some uses, such as for airborne or portable radar indicators where weight is an important consideration, it has been found advantageous to employ air-core deflection coils to deflect the ray of a cathode ray oscilloscope. Such coils must be manufactured and adjusted with care and precision if an objectionable degree of distortion or non-linearity of the magnetic fields provided by them is to be avoided. The method of testing the linearity of the magnetic field by moving an exploring coil from point to point and constructing a graph of field strength distribution is used for limited experimental work but is too time consuming to be practicable for production testing.

It is, accordingly, a principal object of the invention to provide a method of and apparatus for conveniently and rapidly checking the linearity of the magnetic field of air-core deflection coils when mounted for use on a cathode ray oscilloscope.

The invention comprises, in one illustrative form to be described in detail hereinafter, the provision of a set of "standard" air-core deflection coils, constructed and arranged to be conveniently slipped over the regular or "service" deflection coils to be tested, suitable fast and slow sweep deflection current sources and rapidly operable switching facilities whereby deflection in either of the two directions may be alternately controlled by a "standard" coil provided with a recurring slow sweep current while deflection in the other direction is controlled by a regular coil to be tested, hereinafter referred to as a "service" coil, the "service" coil for each of the two cases being provided with a recurring fast sweep current. The "standard" coils are carefully manufactured and adjusted so that the magnetic fields produced thereby will be well within the desired degree of linearity so that when one "standard" coil and one "service" deflection coil are employed, objectionable non-linearity of deflection will result from and be directly attributable to the "service" coil and adjustments or replacements can be made until the desired degree of linearity has been attained. By rapidly switching from one of the above-indicated combinations of coils to the other, for example, at a rate of several times a second, both patterns of sweeps can be displayed simultaneously on the screen of the oscilloscope. Furthermore, with the fast return portion (fly-back portion) of each fast sweep of sufficiently short duration so as to not be visible on the oscilloscope screen, a succession of regularly spaced substantially straight lines, in the absence of appreciable distortion, will be traced on the screen of the tube for each coil as tested. This will result in a succession of horizontal lines for the horizontal service coil and vertical lines for the vertical service coil. The resulting patterns are described hereinafter and are, of course, a meshed composite pattern on the screen in which even small deviations from linearity at any point of the pattern will be readily discernible.

Other objects and features of the invention will become apparent during the course of the following description of an illustrative embodiment of the invention taken in conjunction with the accompanying drawings, in which.

Figure 1:
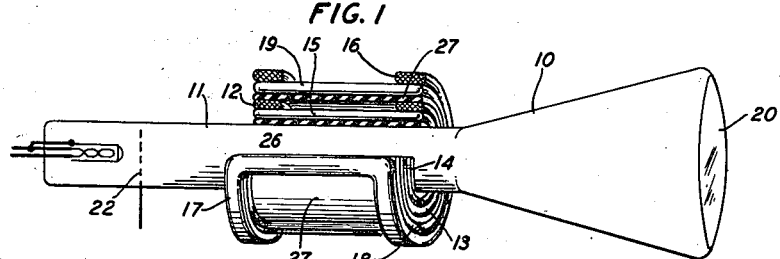
Fig. 1 shows a cathode ray oscilloscope provided with "service" air-core horizontal and vertical deflection coils and with "standard" deflection coils assembled over the service coils, a quarter section of the deflection coil assembly being removed to show the construction more clearly.

In more detail in Fig. 1, the cathode ray tube is designated generally by the numeral 10 and is provided with a suitable ray generating gun, and suitable ray accelerating and focusing devices of any of the numerous types well known in the art (not shown in detail since not directly involved in the invention), these devices being located, in accordance with usual design practices, to the left of the ray deflecting means 12 to 19, inclusive, the latter being assembled on the neck 11 of the cathode ray tube 10. A control anode 22 is also provided and suitable potential sources (not shown) are provided for normal operation of the tube in accordance with conventional practice. "Service" deflecting coils 12 to 15, inclusive, serve in normal use to deflect the ray over the area of the screen 20 of tube 10, the pair of deflecting coils 12, 13 being connected in series aiding relation as will subsequently appear in connection with Fig. 3 and causing the ray to be deflected horizontally and the pair of coils 14, 15 being also connected in series aiding relation but causing the ray to be deflected vertically. The general form of each deflecting coil is shown in Fig. 2A which is described in detail hereinunder.

Figure 2:
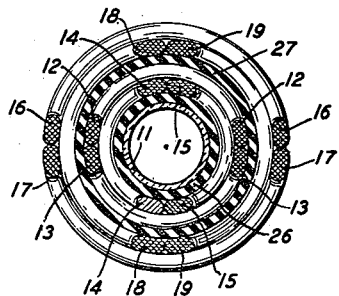
Fig. 2 shows, in a lateral cross-sectional view, the service and standard deflection coil assemblies of Fig. 1 mounted on the neck of the cathode ray tube, the latter being also shown in cross-section.
Figure 2A:
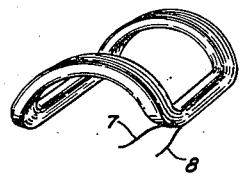
Fig. 2A shows the general form of a single saddle type air-core deflection coil such as is used in the arrangements of the invention.
Figure 3:
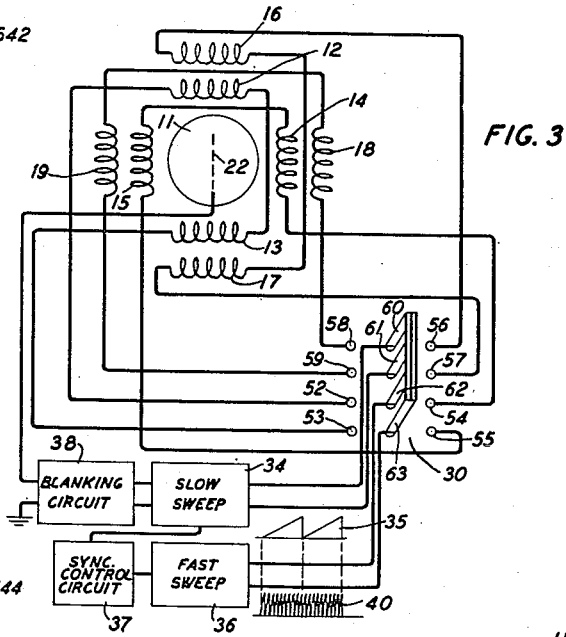
Fig. 3 shows, in schematic diagram form, a testing circuit of the invention for determining the degree of linearity of the "service" coils on a cathode ray oscilloscope.

The "standard" deflecting coils 16 and 19 inclusive, are assembled over the above-mentioned service coils 12 to 15 respectively, as indicated more clearly in the cross-sectional view of Fig. 2 and are also connected in series aiding as shown schematically in Fig. 3. These "standard" coils are, initially, precisely manufactured and adjusted so that the magnetic fields provided by them are well within the desired degree of linearity when employed to deflect the ray of the tube. They should, of course, be rechecked at reasonably frequent intervals to insure that their precision has not been impaired.

In Fig. 2, as mentioned above, a lateral cross-section view of service deflection coils 12 to 15 inclusive, and standard coils 16 to 19 inclusive, assembled on the neck 11 (shown in cross-section) of tube 10, is shown, the standard coils being assembled over the service coils. The fit of the standard coils over the service coils should be sufficiently loose that the standard coils can readily be slipped over the service coils for testing and removed when the tests are completed. Spacer cylinders 26, 27 of phenol fiber or like material are preferably fitted to the service coils as indicated in Figs. 1 and 2 to facilitate assembly on the neck of the tube and assembly of the standard coils over the service coils.

Each set of four coils, i. e., service and standard, should be mechanically bound together by insulating tape or by being mounted on a suitable form or by any similar means well known in the are into a unitary cylindrical assembly so as to be readily slipped over the neck 11 of the tube 10 into proper operating position, the standard coil assembly, of course, being proportioned to slip readily over the service coil assembly.

In accordance with customary practice for this type of deflecting coil each coil is preferably of the "saddle" type as illustrated for a single coil in Fig. 2A, i. e., it is a rectangular "doughnut" shaped coil of insulated wire shaped to conform to the curvature of the neck of the tube 10, each coil extending substantially half-way round the neck of the tube. The inner and outer ends of the coil winding (7, 8 of Fig. 2A) are brought out to make electrical connections with the coil. The horizontal and vertical deflecting coils are paired as shown in Fig. 2, each pair enclosing the neck of the tube and other coils nearer the neck of the tube except for coils 14, 15 which are innermost and enclose only the neck of the tube with phenol fiber cylinder 25 around it. The horizontal deflecting coils 12, 13, 16 and 17 are displaced 90 degrees with respect to the vertical deflecting coils 14, 15, 18 and 19 as shown in Fig. 2.

In Fig. 3 a schematic diagram of the type of testing circuit employed in accordance with the principles of the invention is shown and will now be described in detail.

As above stated, the pair of windings 14, 15 constitute the service vertical deflecting coils and are connected electrically in series aiding. The free ends of these windings are connected to terminals 52, 53 respectively, on switch 30 which is a four-pole double-throw switch. It can be a conventional hand-operated switch, an electromagnetically-operated switch or equivalent assemblage of relay operated spring contact combinations or it can be an equivalent electronically operated switching device of any of the numerous forms of these several switching arrangements well known to those skilled in the art. Since for the purposes of the invention this switch should be operated from one position to the other several times per second, one of the automatically operated types of switch mentioned above is, obviously, preferable.

In like manner, the service horizontal deflecting coils 12, 13 are connected in series aiding and their free ends are connected to terminals 54, 55 of switch 30.

Similarly, the standard horizontal deflection coils 16, 17 are connected in series aiding to terminals 58, 59 and the standard vertical deflection coils 18, 19 are connected in series aiding to terminals 56, 57 of switch 30.

A linear sweep wave generator 34, preferably of any suitable form of the so-called sawtooth wage generators well known in the art, and providing a relatively low sweep, as indicated by sweep wave 35, is connected to switch blades 60, 61. A second sweep wave generator 36 similar to generator 34 but providing a relatively much faster and more frequently recurring sweep, as indicated by sweep wave 40, is connected to switch blades 62, 63. It should be understood that sweep wave 40 is illustrative only. As is well known to those skilled in the art, each fast sweep will usually be followed by a short interval of zero current. For the present purposes, however, the less meticulous illustration employed will suffice to enable one skilled in the art to understand the principles of the invention. By way of example, for a "long persistence" image cathode ray tube the slow sweep can conveniently provide ten sweeps per second and the fast sweep 300 sweeps per second. A synchronizing control 37 connecting to both sweep wave generators 34 and 36 is provided, in accordance with principles well known to those skilled in the art, to keep them in synchronism.

Blanking circuit 38 is optional, though preferable, and operates at or near the peak current of each slow sweep to blank the cathode ray tube 10 by momentarily decreasing the voltage on control anode 22 for a period sufficient to permit the rapid return or "fly-back" sweep of each sawtooth of sweep wave 35 to be effected without tracing a line across the screen 20 of oscilloscope 10. Suitable blanking circuits of numerous varieties are well known in the art. Sweep generators 34 and 36 should, of course, include adjustable direct current biasing circuits of any of the numerous types well known in the art, to enable the starting points of the sweeps to be appropriately positioned on the screen.

In accordance with the above-suggested sweep speeds, 30 lines will be traced on the screen for each slow sweep and these lines will recur at the rate of 300 times per second. For the left position of switch 30 these lines will be horizontal and for the right position of switch 30 the lines will be vertical. The oscilloscope screen 20 is preferably of the "long persistence" of image type, well known to the art, so that a resulting cross-hatched pattern of the general type illustrated by Fig. 4 will be clearly obtained with a reasonably slow rate of sweep repetition. In the event that a tube of shorter "persistence" is to be tested the sweep repetition frequency should be suitably increased.

Figure 4:
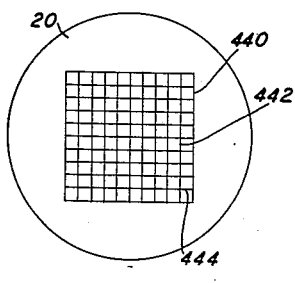
Figs. 4, 5 and 6 illustrate types of indications provided by the circuit of Fig. 3 on the screen of the associated cathode ray oscilloscope.

In Fig. 4, the screen 20 of the cathode ray oscilloscope 10 of Fig. 1 is shown with a pattern of lines generally designated as 440 thereon, comprising 11 vertical lines 442 and 11 horizontal lines 444, the method of obtaining which pattern is described above in detail in connection with the circuit of Fig. 3. The number of lines (30) which would result from the arrangements suggested in Fig. 3 in each instance has been arbitrarily reduced to avoid undue congestion at the small scale of Figs. 4 to 6 inclusive. The pattern of Fig. 4 indicates by its regularity that both of the service coils have a high degree of linearity.

Figure 5:
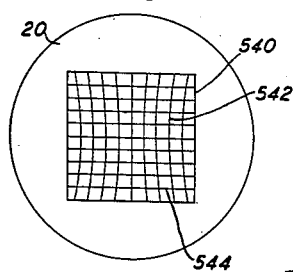
Figure 6:
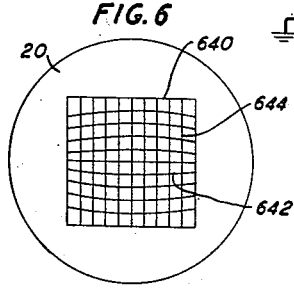

In Fig. 5, in pattern of lines generally designated as 540, the linearity of the horizontal coils appears to be of high degree as evidenced by the straight and regular horizontal lines 544 but the curvature of the vertical lines 542 indicates that the vertical service deflecting coils are introducing a substantial non-linearity. Likewise, in Fig. 6, in the pattern 640, the vertical lines 644 are linear but the horizontal lines 642 involve a substantial non-linearity.

The above-described arrangements are illustrative of one preferred embodiment of the invention. Obviously, numerous equivalent arrangements can be readily devised by those skilled in the art without departing from the spirit and scope of the invention. The scope of the invention is defined in the following claims.

What is claimed is:

1. Apparatus for testing the degree of linearity of the magnetic fields produced by the normal service deflecting coils of a cathode ray oscilloscope having horizontal and vertical air-core deflecting coils which comprises a set of standard horizontal and vertical air-core deflecting coils constructed to be readily assembled over the service coils, said standard coils being manufactured and adjusted to produce magnetic fields having a high degree of linearity, a first source of recurring linear sweep wave current having a relatively long period sweep, a second source of recurring linear sweep wave current having a short period sweep, and switching means for alternately connecting the long period sweep to the horizontal and vertical standard deflecting coils respectively, and simultaneously alternately connecting the short period sweep to the vertical and horizontal service deflecting coils respectively.

2. Apparatus for testing the degree of linearity of the horizontal and vertical deflecting means of an oscilloscope which comprises a set of standard horizontal and vertical deflecting means having a high degree of linearity and adapted to be readily assembled in operative relation with respect to said oscilloscope, a first recurring linear sweep energy source having a relatively long period sweep, a second recurring linear sweep energy source having a relatively short period sweep, and switching means for alternately connecting the said first source to said standard horizontal and vertical deflecting means respectively, and simultaneously connecting the said second source to the vertical and horizontal oscilloscope deflecting means respectively.

3. A method of testing the degree of linearity of the horizontal and vertical deflecting means of an oscilloscope having a movable marking means which comprises alternately deflecting the movable marking means, independently of the deflecting means to be tested, horizontally and vertically respectively, with a high degree of linearity and at a slow sweep speed, and simultaneously alternately deflecting the movable marking means by the deflecting means of the oscilloscope vertically and horizontally respectively, at a fast and rapidly recurring sweep speed.

4. A method of testing the degree of linearity of a bi-directional deflecting means of an oscilloscope having a movable marking means which comprises deflecting the movable marking means, independently of the deflecting means to be tested, in one direction with a high degree of linearity at a slow sweep speed, and simultaneously deflecting the movable marking means by a portion of the deflecting means to be tested at a fast and rapidly recurring sweep speed in a second direction normal to said one direction.

ADOLPH C. EKVALL.

REFERENCES CITED

The following references are of record in the file of this patent:

UNITED STATES PATENTS

| Number | Name | Date |
|---|---|---|
| 2,098,390 | Iams | Nov. 9, 1937 |
| 2,121,359 | Luck | June 21, 1938 |
| 2,395,966 | Goldberg | Mar. 5, 1946 |